United States Patent Office 3,714,078
Patented Jan. 30, 1973

3,714,078
FOAMABLE ACRYLIC LATEX COMPOSITION AND METHOD OF PREPARATION
Philip L. Gordon, Lexington, and Augustin La Torre, Burlington, Mass., assignors to General Latex and Chemical Corporation, Cambridge, Mass.
No Drawing. Continuation-in-part of application Ser. No. 683,828, Nov. 17, 1967. This application Sept. 16, 1970, Ser. No. 72,819
Int. Cl. C08f 47/08, 37/18, 15/42
U.S. Cl. 260—2.5 L
31 Claims

ABSTRACT OF THE DISCLOSURE

A foamable latex composition and method of preparing the composition, the composition comprising an aqueous emulsion of a copolymer containing: a lower alkyl acrylate, a nitrile, an unsaturated carboxylic acid, an amide and an aryl polyether alcohol surfactant as substantially the sole surfactant employed in the preparation of the aqueous emulsion. This latex composition when foamed, coated on a fabric, the foam crushed and cured provides a product with good hand, light-fastness, abrasion resistance and dry-clean characteristics.

This application is a continuation-in-part application of U.S. Ser. No. 683,828, filed Nov. 17, 1967 (now abandoned).

BACKGROUND OF THE INVENTION

Foams formed from foamable latex compositions have found increasing utility particularly as coatings or laminated to fabrics to impart various properties thereto such as increased thermo-insulation, resistance to water and solvents, opacity, and acoustical insulation. Further, the properties of flexibility, color fastness to light, breathability and soft hand must also often be attainable. In the past, however, the preparation of foamable compositions to provide some of these properties often resulted in the loss of other properties.

Foamable acrylic resins, while providing good color fastness to light often failed to provide the desired wash and solvent resistance, and fabrics coated therewith were too stiff, i.e., had poor hand. Polyvinyl chloride plasticized resins generally have poor temperature resistance and the plasticizers may migrate into the fabric thus reducing flexibility and discoloring the fabric. Urethane compositions have poor resistance to sunlight. Natural and synthetic elastomers and their carboxylic derivatives are often not suitable because of their tendency to discolor upon use, due in part to the residual conjugated bonds in the elastomer.

In spite of their shortcomings, acrylic resins are desirable for forming foams, and particularly for coating drapery fabrics with foams because of the excellent low temperature resistance, lack of necessity for external plasticization and good color fastness on exposure to light. Particular acrylic resin compositions have been known and employed in coating fabrics. For example, in U.S. Pat. No. 3,296,023, issued Jan. 3, 1967, to A. J. Leaderman et al., a coated fabric is disclosed employing an acrylic resin polymerized in situ by the use of an acid catalyst, to obtain thermo-insulating properties by the use of specific ranges of filler material. However, such resins are not foamed and as the desire for increased thermo-insulating characteristics and the need for heavier coatings increases, the flexibility and hand of fabrics coated with such a solid coating rapidly diminishes. In addition, such coatings are not breathable and have limited usefulness where breathability is desired, such as in apparel lining and rainwear.

U.S. Pat. No. 2,868,752, issued Jan. 13, 1959 to Frasier et al. discloses a particular acrylic composition which employs a specific anionic emulsifier. Such a composition is deficient in forming an acceptable foam structure. U.S. Pat. No. 3,215,647, issued Nov. 2, 1965 to E. R. Dunn discloses a particular copolymer which is subject to the aforementioned deficiencies of the elastomers. The above patents are incorporated by reference herein in their entirety.

Accordingly, it is one object of this invention to provide a foamable latex composition, which when foamed and coated on a support such as a fabric provides a product which possesses a good hand, light-fastness, abrasion resistance and can be dry cleaned.

SUMMARY OF THE INVENTION

The present invention is directed to a foamable latex composition composed of an aqueous emulsion of a copolymer having as essential components: (a) a lower alkyl acrylate; (b) a nitrile; (c) an unsaturated carboxylic acid; (d) an amide; and (e) an aryl polyether alcohol surfactant.

The surfactant employed is an aryl polyether alcohol, preferably an alkylaryl polyether alcohol such as alkylphenoxypolyethoxy ethanol, more preferably the octylphenoxypolyethoxyethanols and nonylphenoxypolyethoxyethanols. In a particularly preferred embodiment, the surfactant is an octylphenoxypolyethoxyethanol, i.e., one prepared by the reaction of t-octylphenol with ethylene oxide, having a molecular weight of about 2000. These surface-active agents are nonionic in type and are known to the art. For example, they are commercially available under the trade name "Triton" (Rohm & Haas Company, Philadelphia, Pa.).

As examples of suitable acrylates which may be employed, mention may be made of $C_1$–$C_6$ acrylates, e.g., methyl, ethyl, isopropyl, butyl and 2-ethylhexyl acrylates. Preferably, ethyl acrylate is employed.

Typical nitrile monomers include acrylonitrile as well as alkyl-substituted acrylonitriles such as methacrylonitrile.

The unsaturated carboxylic acids include acrylic acid, methacrylic acid, itaconic acid, fumaric acid, maleic acid and the like.

The amides suitable for use in the present invention include acrylamides and methylolacrylamides and their substituted derivatives, such as alkylaryl amides and alkyl methylolacrylamides, such as diacetone acrylamide.

It has been found that the combination of the aforementioned monomers and the specific surface-active agent provides a foam with properties unattainable in prior art compositions. These advantageous properties are evident throughout the entire process involved in the preparation of the foam structure.

It is desirable that foams should meet the following criteria during the various stages of preparation.

(A) Precure or wet foam stage:
   (1) Small but uniform bubble structure.
   (2) Good rolling bank.
(B) Setting and drying stage:
   (1) No surface cracks.
   (2) No breakdown in bubble structure.
   (3) No foam collapse.
   (4) Even surface.
(C) Crushing and curing stage:
   (1) Good cell wall tack to get uniform crushing under pressure rolls.
   (2) No surface cracks.

Only with the novel copolymer of the present invention with the specific recited surfactant would the aforementioned criteria be met.

The following table illustrates the range and components of the copolymer as well as preferred components and the preferred range.

TABLE I.—Acrylic Copolymer

| Ingredients | Parts by weight Range | Preferred range |
|---|---|---|
| Acrylate monomer (ethyl acrylate) | 60–100 | 75–85 |
| Nitrile monomer (acrylonitrile) | 5–20 | 10–15 |
| Unsaturated carboxylic monomer (acrylic acid) | 0.5–5.0 | 1–2 |
| Amide (methylol acrylamide) | 0.5–5.0 | 1–3 |

The surfactant is employed at a level of 1 to 10% by weight, based on the weight of the monomers. Preferably 3.5 to 4.5% by weight is employed.

The foamable acrylic copolymer composition is prepared by a method of incremental addition wherein a small amount of the surface active agent and water is employed to prepare a preemulsion of the entire monomeric mixture. About 10% of the preemulsion is then introduced into a reactor into which is also added a redox catalyst system comprising, for example, an inorganic persulfate as the oxidizing agent and a bisulfite or a meta bisulfite as a reducing agent. Once the polymerization reaction has been initiated, separate oxidizing and reducing agent streams as well as the remaining portion of the emulsion are introduced into the reactor with the temperature maintained at about 130 to 150° F. until the polymerization is completed.

The polymerization catalyst may be activated by an organic or inorganic acid, preferably an organic acid such as mono, di, tri, or other polycarboxylic acid containing an unsaturated group.

The solids of the latex may vary over a relatively wide range. Preferably, the latices are 50% solids.

The following non-limiting examples illustrates the novel composition of the present invention prepared by the above-described procedure. The following compositions also include iron sulfate (trace), ammonium persulfate (0.138 part by weight), sodium metabisulfite (0.182 part by weight) and de-ionized water (96.12 parts by weight).

EXAMPLE 1

| | Parts by weight |
|---|---|
| Ethyl acrylate | 80.16 |
| Acrylonitrile | 10.46 |
| Methacrylic acid | 0.92 |
| Itaconic acid | 0.28 |
| Methylolacrylamide (60%) | 3.12 |

Octylphenoxypolyethoxyethanol surfactant—3.5% based on weight of monomers.

EXAMPLE 2

| | Parts by weight |
|---|---|
| Ethyl acrylate | 50 |
| Butyl acrylate | 50 |
| Acrylonitrile | 10 |
| Acrylic acid | 1.5 |
| Methylolacrylamide | 2 |

Octylphenoxypolyethoxyethanol surfactant—4.5% based on weight of monomers.

EXAMPLE 3

| | Parts by weight |
|---|---|
| Butyl acrylate | 60 |
| Acrylonitrile | 15 |
| Acrylic acid | 2 |
| Methylolacrylamide | 1 |

Nonylphenoxypolyethoxyethanol — 3.0% based on weight of monomers.

EXAMPLE 4

| | Parts by weight |
|---|---|
| Ethyl acrylate | 50 |
| 2-ethylhexyl acrylate | 45 |
| Acrylonitrile | 12 |
| Methacrylic acid | 1.5 |
| Methylolacrylamide | 2 |

Nonylphenoxypolyethoxyethanol — 6% based on weight of monomers.

EXAMPLE 5

| | Parts by weight |
|---|---|
| 2-ethylhexyl acrylate | 80 |
| Acrylonitrile | 20 |
| Methacrylic acid | 3 |
| Acrylamide | 1 |

Octylphenoxypolyethoxyethanol — 4.5% based on weight of monomers.

EXAMPLE 6

| | Parts by weight |
|---|---|
| Ethyl acrylate | 50 |
| Butyl acrylate | 25 |
| 2-ethylhexyl acrylate | 25 |
| Acrylonitrile | 15 |
| Acrylic acid | 1 |
| Acrylamide | 4 |

Octylphenoxypolyethoxyethanol — 7% based on weight of monomers.

The following table illustrates the effect on foam characteristics by surfactants. An "X" indicates satisfactory characteristics. In all cases the copolymer composition of Example 1 was used with the specified surfactant.

TABLE II

| | Alkylaryl sulfate | Alkylaryl polyester sulfate | Alkyl sulfate | Alkyl phenoxy polyether ethanol (Triton X405) |
|---|---|---|---|---|
| A. Pre-cure stage: | | | | |
| Small but uniform cell structure | – – | – – | X | X |
| Good rolling bank | – – | X | – – | X |
| B. Setting and drying stages: | | | | |
| No surface cracks | – – | X | X | X |
| No foam collapse | X | – – | X | X |
| Uniform cells | X | – – | X | X |
| C. Crushing and curing stages: | | | | |
| Good cell wall tack to get uniform crushing under pressure rolls | – – | – – | – – | X |
| No surface cracks | – – | X | – – | X |
| Good water and dry cleaning resistance | X | X | X | X |

The foregoing table shows that only by employing the specific surfactant in the specific copolymer latex can the overall superior properties be achieved in the foam system throughout the entire handling process. Even employing the same monomer system the alkyl sulfates for example, did not impart the desired characteristics in the crushing and curing stages whereas the alkyl aryl sulfates did not form a satisfactory cell structure. Other latices, containing surfactants such as the phosphate ester of the ethylene oxide adduct of nonylphenol, the ethylene oxide adducts of long chain aliphatic alcohols, the ethylene oxide adducts of fatty acid substituted polyhydric alcohol or amine polyglycol condensates contained such a quantity of coagulum, in some cases over 25% coagulum, that they could not even be evaluated. A latex prepared with an ethylene oxide adduct of propoxylated glycol could not be satisfactorily compounded to prepare a suitable foam.

Of course, the above formulation may also contain additional conventional ingredients in varying amounts. Typical water soluble thickeners to adjust to formulations to the proper viscosity include cellulose ethers, e.g. carboxymethyl cellulose, natural or synthetic water soluble gums, polyvinyl pyrrolidone or the like. Pigments such as titanium dioxide and zinc sulphide are employed.

Plasticizers, particularly non-migrating plasticizers may also be employed at the discretion of the operator.

Typical mineral fillers include talc, clay, diatomaceous earth, calcium carbonate, silica and the like. Typical buffering agents used include alkaline agents, salts like di-ammonium acid phosphate, trisodium polyphosphate and the like. Various antitack agents, such as wax emulsions like a paraffin wax; colloidal silica and the like may be used. Since the latex must be foamable, the addition of antifoam agents such as silicones should be avoided.

In a preferred embodiment, materials such as the amino-aldehyde resins which are cross-linking agents and which coreact with the acrylic copolymers are added in small amounts. The materials include those coreactive materials set forth in U.S. Pat. No. 3,215,647. Particularly preferred coreactive resin materials include melamine, melamine formaldehyde condensates, urea-formaldehyde condensates, butylated melamine formaldehyde condensates, and the like.

As stated above, the novel foamable latex compositions of the present invention are employed for coating substrates such as fabrics, films, etc., with foams. The latex copolymer composition is foamed and then coated on the surface.

The coating is then dried at a temperature of less than 300° F., e.g. 165°–270° F. and for a time period insufficient to significantly or substantially cure or crosslink the acrylic-nitrile copolymer but to dry the foam. In this manner a dried, rigid or semirigid, thin foam coating is obtained on the fabric which coating is then subsequently densified, that is increased in foam density such as by passing the coated fabric through one or more calendering or embossing operations. For example, a coated substrate, such as a fabric is passed between pressure rolls at 100–150 p.s.i. to crush or densify. The foam thickness of the lightly cross-linked dried foam coating is reduced more than about 20% for example, 40–80%. Thereafter, or simultaneously with such densifying, the coated fabric is heated to a temperature of greater than about 300° F., for example, 300–375° F. to cure or substantially cross-link the densified foam coating. Despite the post-curing operation after the calendering operation, the coated foam fabric still has excellent drape properties which is surprising since one would expect the post-curing operation to stiffen the hand of the fabric. To obtain the fabrics having the desired properties it is preferable to employ such sequential and separate operations, that is, drying and curing with an intermediate operation of densifying by embossing or calendering.

The material to be coated, may for example be any sheet material or fabric such as a woven, non-woven or knitted fabric of natural or synthetic fibers or mixtures thereof such as woven open weave cotton material and bleached muslin or silk or wool or synthetic fibers such as vinyl chlorides, polyethylene, polypropylene, polyesters, viscose, polyamides, and acrylics as well as paper, fiberglass, canvas, felt, films, foils, and the like. As an example of a suitable fabric mention may be made of a tufted rug. If desired a suitable tie coat or barrier coat known to the art is employed.

The wet foam coated onto the surface of the fabric generally has a foam density ranging from about 7 to 30 lbs./cu. ft., while the dry foam has a foam density ranging from about 4 to 18 lbs./cu. ft., and, after calendering, a foam density of 12 to 54 lbs./cu. ft. The foam may be coated onto substantially all or only a designated portion of the fabric. The thickness of the foam coating may vary depending upon the use of the finished product and may range, for example, from 1 mil. to 10 mil. with a resistance to washing and dry cleaning and insulation properties.

It has been found that our stable emulsions of our copolymer are prepared in the presence of a nonionic surfactant as the sole or substantially the sole surfactant, and that such surfactant should possess a proper hydrophobic-hydrophilic balance. In the preparation of our foamable latex compositions, small amounts generally less than 5% of the total weight of the surfactant of other ionic surfactants or compounds acting as surfactants can typically be tolerated, but larger amounts usually greater than 2 to 10% often cause a rapid diminution in the desirable qualities of the foamable latex composition. For example, the introduction of anionic surfactants such as the alkylaryl polyether sulfates, ethoxylated sodium sulfoacid esters such as an ethoxylated sodium sulfosuccinate as well as the esters or salts of fatty acids or alcohol sulfates such as sodium aryl sulfates during the preparation of the copolymeric emulsion effects the shelf life and may induce coagulation as well as undesirable increases in viscosity. Some aqueous copolymeric emulsions where an alkylaryl polyether surfactant is employed as substantially the sole surfactant in the preparation of the emulsion copolymer where the surfactant contains a marginal hydrophobic-hydrophilic balance provides latex compositions of high viscosity, but on dilution, these latex compositions still provide acceptable foamable latex compositions for use in preparing foam-coated fabrics. After the preparation of our foamable latex compositions, the stability of the emulsion copolymer provided by our discovery then permits some additional quantities of a nonionic or cationic surfactant to be incorporated without severely diminishing acceptable foamability or stability properties of the composition.

The preferred surfactants employed in the preparation of our foamable latex composition are those alkylphenoxypolyethoxyethanols such as the octyl and nonyl alkyl derivatives which are commercially available, and wherein the number of ethoxy groups; that is, the mole ratio of the ethoxy groups in the molecule, ranges from approximately from 30 to 100, and more particularly, from about 40 to 70. Other alkylphenoxypolyalkoxyalkanols may be employed as desired providing they provide an equivalent hydrophobic-hydrophilic balance similar to those octyl phenoxypolyethoxyethanols. Typical surfactants would include $C_6$–$C_{16}$ alkylphenoxy, $C_2$–$C_8$ alkoxy, $C_2$–$C_3$ alkanols prepared by the reaction of alkyl phenols with epoxide compounds such as propylene oxide, ethylene oxide, octylene oxide, butylene oxide, $C_{12}$–$C_{14}$ epoxides and other such epoxide-type compounds reactive with phenols to provide nonionic surfactants, the alkylphenoxypoly $C_2$–$C_3$ alkoxys $C_2$–$C_3$ alkanols, the preferred surfactants employed in preparing our stable emulsion copolymers. In general, the percent of the alkoxy groups in the alkylaryl polyether surfactants may range from about 85 to 95% by weight.

EXAMPLE 7

An aqueous emulsion of the copolymer as of Example 1 was prepared, except that different surfactants were employed as set forth in 7A to 7O. After preparation, the stable aqueous copolymer was compounded with conventional fillers, pigments, foaming and lubricating agents to form a latex composition (part A) having a dry weight of 188 parts.

A foam was prepared by adding to part A, just prior to foaming, about 10 parts of a melamine-formaldehyde condensate resin and 10 parts of benzyl butyl phthalate and the resulting composition mixed in a laboratory mixer at high speed for about two (2) minutes. When the foam reached the desired level, the mixer speed was reduced and the foam refined for about one (1) minute and the cup height (3 ounces) determined. The cup height was 15 to 20 grams, otherwise additional whipping and refining was carried out.

The foam was knife-coated onto a cotton fabric at a thickness of about 35 mils and the coated fabric placed in an oven for two (2) minutes at 300° F. to gell the foam.

The gelled foam was then crushed by placing an aluminum foil on top and running the fabric through a pair of rubber squeeze rolls. The crushed gelled foam was then cured in an oven for three (3) minutes at 275° F.

A surfactant was employed in the preparation of the aqueous emulsion of the copolymer as follows with the weight of the surfactant employed kept constant:

| | | | |
|---|---|---|---|
| 7A | Triton X405 | t-Octyl phenoxy polyethoxyethanol | 40 ethoxy groups. |
| 7B | Triton X305 | do | 30 ethoxy groups. |
| 7C | Igepal CO 977 | Nonyl phenoxy polyethoxyethanol | 50 ethoxy groups. |
| 7D | Triton X705 | t-Octyl phenoxy polyethoxyethanol | 70 ethoxy groups. |
| 7E [1] | 50% Triton X305, 50% Triton X405 | | About 34 ethoxy groups. |
| 7F [1] | 50% Triton X305, 50% Triton X705 | | About 58 ethoxy groups. |
| 7G [1] | 50% Triton X165, 50% Triton X705 | | About 39 ethoxy groups. |
| 7H | Igepal CO 887 | Nonylphenoxy polyethoxyethanol | 30 ethoxy groups. |
| 7I | Igepal CO 897 | do | 40 ethoxy groups. |
| 7J | 50% Igepal CO 897, 50% Triton X165 | | About 29 ethoxy groups. |
| 7K [1] | 98% Triton X405, 2% Triton X202 | Alkylaryl polyether sulfate | |
| 7L [1] | 98% Triton X405, 2% Aerosol A102 | Ethoxylated sodium sulfo succinate | |
| 7M | 98% Triton X405, 2% Sipex UB | Sodium lauryl sulfate | |
| 7N | 95% Triton X405, 5% Triton X202 | | |
| 7O | 95% Triton X405, 5% Sipex UB | | |

[1] Solids basis.

NOTE.—Triton is a trademark of Rohm & Haas Co.; Igepal is a trademark of GAF Corporation; Sipex is a trademark of American Alcolac; Aerosol is a trademark of American Cyanamid.

The latex composition 7O and 7N coagulated in 2 and 7 days respectively, while 7B increased in viscosity on dilution and provided a poor quality foam. Examples 7C and 7G also became thick on dilution, but provided a good quality foam, and all others produced acceptable foam and crushed foam fabrics.

The results indicate that the octyl and nonylphenoxypolyethoxyethanols having from about 30 to 70 moles of ethoxy groups or molecules in the absence of anionic surfactants, 2 or less of the surfactant weight provided an acceptable foamable acrylic latex composition.

Our invention has been illustrated by the examples set forth, which examples are not to be restrictive of the scope of the invention.

What is claimed is:

1. A foamable latex composition comprising an aqueous emulsion of a copolymer, which copolymer consists essentially of from about 50 to 100 parts by weight of a lower alkyl acrylate, about 5 to 20 parts by weight of a nitrile selected from the group consisting of acrylonitrile and methacrylonitrile, about 0.5 to 5.0 parts by weight of a monomeric unsaturated carboxylic acid, about 0.5 to 5.0 parts by weight of an amide selected from the group of acrylamides and methylolacrylamides, the composition containing as the sole primary surfactant for the emulsification of the monomeric compounds from about 0.1 to 10% by weight based on the weight of the monomers of an alkylphenyl polyether alcohol characterized by a hydrophobic-hydrophilic balance equivalent to a t-octyl phenoxypolyethoxyethanol which contains from about 30 to 70 ethoxy groups.

2. The composition of claim 1 which includes a cross-linking amount of an amino aldehyde resin.

3. The composition of claim 1 wherein the monomeric carboxylic acid is an acid selected from the group consisting of acrylic acid, methacrylic acid, itaconic acid, fumaric acid and maleic acid.

4. The composition of claim 1 wherein the amide is selected from the group consisting of alkyl acrylamides, alkyl methylolacrylamides, acrylamides, methylolacrylamides, and acetone acrylamides.

5. The composition of claim 1 wherein the surfactant comprises from about 2.0 to 6.0% by weight of the monomers.

6. The composition of claim 1 wherein the alkylphenyl polyether alcohol is an alkylphenoxypolyethoxyethanol.

7. The composition of claim 1 wherein the hydrophobic-hydrophilic balance is equivalent to a t-octyl phenoxypolyethoxy ethanol which contains from about 40 to 70 ethoxy groups.

8. The composition of claim 1 which contains less than about five (5) percent by weight based on weight of the alkylaryl surfactant of an anionic surfactant.

9. A foamed latex composition comprising the foamed latex composition of claim 2 which contains a $C_8$–$C_9$ alkylphenoxypolyethoxyethanol having from about 40 to 70 ethoxy groups.

10. A dry foam product comprising the cross-linked copolymer of claim 2.

11. A fabric containing a cross-linked dry crushed foam layer comprising the cross-linked copolymer of claim 2.

12. A stable aqueous emulsion of a copolymer consisting essentially of from about 75 to 85 parts by weight of a lower alkyl acrylate, about 10 to 15 parts by weight of a nitrile selected from the group consisting of acrylonitrile and methacrylonitrile, about 0.5 to 5.0 parts by weight of a monomeric unsaturated carboxylic acid selected from the group consisting of acrylic acid, methacrylic acid, itaconic acid, fumaric acid and maleic acid and about 0.5 to 5.0 parts per weight of an amide selected from the group consisting of acrylamides and methylolacrylamides, the composition containing as the sole primary surfactant for the emulsification of the monomeric compounds of the copolymer from about 0.1 to 10% by weight based on the weight of the monomers of an alkylphenoxypolyethoxyethanol which contains about 30 to 70 ethoxy groups.

13. The composition of claim 12 wherein the nonionic surfactant is a nonylphenoxypolyethoxyethanol.

14. The composition of claim 12 wherein the surfactant is an octylphenoxypolyethoxyethanol.

15. The composition of claim 12 wherein the nonionic surfactant is present in an amount of from about 3.5 to 4.5% by weight based on the weight of the monomers.

16 The composition of claim 12 which includes a cross-linking amount of an amino aldehyde resin.

17. The composition of claim 12 which contains less than about two (2) percent based on the weight of the surfactant of an anionic surfactant.

18. A dry foam product comprising the cross-linked copolymer of claim 16.

19. A fabric containing a dried foam layer comprising the cross-linked copolymer of claim 16.

20. A fabric containing a crushed dried foam layer of claim 19.

21. A foamable latex composition comprising an aqueous emulsion of a copolymer, which copolymer consists essentially of from about 50 to 100 parts by weight of a lower alkyl acrylate, about 5 to 20 parts by weight of a nitrile selected from the group consisting of acrylonitrile and methacrylonitrile, about 0.5 to 5.0 parts by weight of a monomeric unsaturated carboxylic acid, about 0.5 to 5.0 parts by weight of an amide selected from the group consisting of acrylamides and methylolacryamides, the composition containing as the sole surfactant from about 0.1 to 10% by weight based on the weight of the monomers of an alkylphenoxypolyethoxyethanol which contains about forty ethoxy groups.

22. The composition of claim 21 which includes a cross-linking amount of an amino aldehyde resin.

23. The composition of claim 21 wherein the monomeric carboxylic acid is an acid selected from the group consisting of acrylic acid, methacrylic acid, itaconic acid, fumaric acid and maleic acid.

24. A dry foam product comprising the cross-linked polymer of claim 21.

25. A fabric containing a cross-linked dry foam layer comprising the cross-linked copolymer of claim 21.

26. A foamable latex composition comprising an aqueous emulsion of a copolymer consisting essentially of from about 75 to 85 parts by weight of a lower alkyl acrylate, about 10 to 15 parts by weight of a nitrile selected from the group consisting of acrylonitrile and methacrylonitrile, about 0.5 to 5.0 parts by weight of a monomeric unsaturated carboxylic acid selected from the group consisting of acrylic acid, methacrylic acid, itaconic acid, fumaric acid and maleic acid and about 0.5 to 5.0 parts per weight of an amide selected from the group consisting of acrylamides and methylolacrylamides, the composition containing as the sole surfactant from about 0.1 to 10% by weight based on the weight of the monomers of an alkylphenoxypolyethoxyethanol which contains about forty ethoxy groups.

27. The composition of claim 26 wherein the nonionic surfactant is a nonylphenoxypolyethoxyethanol.

28. The composition of claim 26 wherein the surfactant is an octylphenoxypolyethoxyethanol.

29. The composition of claim 26 wherein the nonionic surfactant is present in an amount of from about 3.5 to 4.5% by weight based on the weight of the monomers.

30. A dry foam product comprising the cross-linked copolymer of claim 26.

31. A fabric containing a dried foam layer comprising the cross-linked copolymer of claim 20.

References Cited

UNITED STATES PATENTS

| | | | |
|---|---|---|---|
| 3,255,139 | 6/1966 | Dinges et al. | 260—80.73 |
| 3,231,533 | 1/1966 | Garrett et al. | 260—80.73 |
| 3,104,231 | 9/1963 | Fitch | 260—80.73 |
| 3,365,410 | 1/1968 | Wesslau et al. | 260—29.6 TA |
| 3,215,647 | 11/1965 | Dunn | 260—2.5 L |
| 3,491,033 | 1/1970 | Dunn. | |
| 3,527,654 | 9/1970 | Jones et al. | |
| 3,598,770 | 8/1971 | Moore et al. | |
| 3,607,341 | 9/1971 | Goins et al. | |

MURRAY TILLMAN, Primary Examiner

W. J. BRIGGS, SR., Assistant Examiner

U.S. Cl. X.R.

117—138.5, 138.8 A, 139.5 A, 140 R, 161 UT, 2.5 N, 2.5 F, 29.4 UA, 29.6 TA, 29.6 E, 80.73, 851

UNITED STATES PATENT OFFICE
CERTIFICATE OF CORRECTION

Patent No. 3,714,078  Dated January 30, 1973

Inventor(s) Philip L. Gordon and Augustin LaTorre

It is certified that error appears in the above-identified patent and that said Letters Patent are hereby corrected as shown below:

In column 10, claim 31, line 4, remove "20" and insert therefor --26--.

Signed and sealed this 3rd day of July 1973.

(SEAL)
Attest:

EDWARD M. FLETCHER, JR.  Rene Tegtmeyer
Attesting Officer  Acting Commissioner of Patents